United States Patent [19]

Wieland et al.

[11] Patent Number: 4,599,239

[45] Date of Patent: Jul. 8, 1986

[54] METHOD OF PREPARING NONALCOHOLIC BEVERAGES STARTING WITH A DEAERATED LOW SUGAR CONCENTRATION BASE

[75] Inventors: Dieter Wieland; Hartmut Meinert, both of Dusseldorf; Hans-Ulrich Pohl, Essen, all of Fed. Rep. of Germany

[73] Assignee: Die Firma Follpack Dipl Brauerei-ing Dieter Wieland, Dusseldorf, Fed. Rep. of Germany

[21] Appl. No.: 508,751

[22] Filed: Jun. 28, 1983

[30] Foreign Application Priority Data

Jul. 2, 1982 [DE] Fed. Rep. of Germany ....... 3224706

[51] Int. Cl.$^4$ .......................... A23L 2/00; A23L 2/26; A23L 2/32; G01N 33/14

[52] U.S. Cl. .................... 426/590; 426/231; 426/477; 426/487

[58] Field of Search ............... 426/477, 590, 591, 231, 426/487

[56] References Cited

U.S. PATENT DOCUMENTS

| | | | |
|---|---|---|---|
| 3,607,303 | 9/1971 | Bingham | 426/477 |
| 4,191,784 | 3/1980 | Mojonnier et al. | 426/477 |
| 4,350,503 | 9/1982 | Skoli et al. | 426/477 |

OTHER PUBLICATIONS

Newill, Phyllis Krafft; *Good Food and How To Cook It,* D. Appleton-Century Co., New York, 1939; p. 445.

Woodroof, J. G. et al.,; *Beverages: Carbonated and Non-Carbonated,* AVI Publ. Co. ©1974, pp. 190-195.

*Primary Examiner*—Thomas G. Wiseman
*Assistant Examiner*—Elizabeth C. Weimar
*Attorney, Agent, or Firm*—Sprung Horn Kramer & Woods

[57] ABSTRACT

A method for the preparation of nonalcoholic beverages, especially carbonated beverages, and an apparatus for the practice of the method. First a sugar solution of prescribed concentration is prepared by dissolving sugar in deaerated water with an oxygen content below 0.15 mg/l. The sugar solution is adjusted in an additional deaeration to an oxygen content of less than 0.1 mg/l. The deaerated sugar solution can be finally adjusted to a prescribed concentration with deaerated water and carbonated, and finally it is mixed with flavorings specific to the beverage.

8 Claims, 2 Drawing Figures

4,599,239

METHOD OF PREPARING NONALCOHOLIC BEVERAGES STARTING WITH A DEAERATED LOW SUGAR CONCENTRATION BASE

BACKGROUND OF THE INVENTION

1. Field of the Invention

The invention relates to a method for the production of nonalcoholic beverages, especially carbonated beverages, in which a solution of sugar and flavorings and/or materials specific to the beverage is prepared in deaerated water.

2. Discussion of Prior Art

It is known to produce refreshing beverages by adding to a given amount of deaerated and in some cases carbonated water a likewise given amount of a syrup which consists of a concentrated sugar solution ranging from 45° to 65° Brix and flavorings and/or raw materials specific for the beverage. The mixture of water and syrup is prepared in known mixing apparatus, which are often referred to as premixers, and from which the finished product, which in some cases is carbonated, is delivered to a bottling machine.

The known methods have in common the deaeration of the water, which precedes the mixing process, this can be performed in various ways and results in residual oxygen contents of 1 to 2 mg/l of water. In the other steps of the processes there are differences. Occasionally, the water that is to be mixed with the syrup is carbonated to a degree appropriate for the end product, while in other cases the mixture previously prepared from deaerated water and syrup is carbonated.

One disadvantage inherent in all known methods is that the "syrup" starting product contains a relatively large concentration of air which is brought into the syrup with the raw materials, such as powdered sugar, or is brought in by agitators when the syrup is prepared in the dissolving tanks, thereby increasing the residual oxygen content in the end product. This residual oxygen content adversely affects flavor stability, and quality stability of the end product and is detrimental to the carbonation and bottling of the end product.

Another disadvantage of the known methods is that vessels have to be prepared for the production of syrup, and their size and number depends on the bottle filling output, the number of types of beverage to be produced, and a required deaeration holdover of about 24 hours prior to bottling. The apparatus required for this purpose require considerable space in buildings, and a large investment in storage tanks and hoppers with the related piping and cleaning apparatus.

It has furthermore proven disadvantageous in the known apparatus that mixing apparatus known as premixers operate at their full and constant power in the so-called "stop-and'go" operation, and they are controlled by means of sensors inside of the apparatus and on the basis of detecting the amount taken by the bottle filler. The filler itself is greatly dependent in its operation on the operation of input- and output-connected devices such as those used today for the fully automatic operation of the filler. The consequence of this procedure is that the carbonating and mixing performed by means of the premixer must, after every stop, be again regulated and monitored when it is started up again. This results in fluctuations in the composition of the beverage, which become apparent in the filled bottles through variations in the quality analysis.

Furthermore, the "stop-and'go" process has an adverse effect on the output of the bottling equipment, and subjects the pumps to severe wear, and the frequent stopping and starting tends to result in high power consumption and greater stress on motors.

It is an object of the invention, therefore, to provide a method for the production of nonalcoholic refreshing drinks, especially those containing carbon dioxide, whereby a substantially reduced content of air and oxygen in the end product can be achieved, which does not require the creation of stocks of the syrups specific for the beverage, and in which one realizes extraordinarily great flexibility in the continuous production of different types of beverages on demand. Furthermore, high output combined with low power consumption and low wear are also to be achieved.

SUMMARY OF THE INVENTION

Broadly, this invention contemplates a process for preparing a nonalcoholic beverage comprising the steps of:

(A) preparing a sugar solution by dissolving powdered or liquid sugar in deaerated water having an oxygen content below 0.15 mg/l, the concentration of the sugar in the solution corresponding at least to the highest concentration required for preparation of the beverage;

(B) adjusting the concentration of oxygen in the resultant sugar solution to less than 0.1 mg/l by deaerating the same; and (C) adding to the so deaerated sugar solution flavoring materials or additives.

Preferably, the water used in step A is deaerated by vacuum degassing. It is also preferred to vacuum degas the sugar solution obtained from step A in accordance with step B.

The deaerations of water or sugar solutions can be effected by initially dissolving in these solutions a given amount e.g. 100 to 3000 mg/l of a different gas e.g. carbon dioxide, nitrogen soluble in the water or sugar solution prior to degassing e.g. vacuum degassing.

As an alternate to vacuum degassing one can effect deaeration by gas washing the water or sugar solution.

The process can be performed by adjusting the water concentration of the deaerated sugar solution before addition of the flavoring materials or additives. For instance the water content of the so deaerated sugar solution, following step B, can be adjusted to a concentration between 50,000 and 200,000 mg/l. Similarily at this stage or subsequent to adjustment of the water concentration the deaerated sugar solution can be carbonated to a desired carbon dioxide content e.g. between 2000 and 10,000 mg/l, before the addition of the flavoring materials or additives.

Similarily, after the addition of the flavoring materials or additives, the density and/or carbon dioxide content of the resultant product can be measured and the feed of deaerated water and/or carbon dioxide to the deaerated sugar solution can be regulated to desired final water and/or carbon dioxide values.

The process can also be performed by simultaneously or alternating production of different nonalcoholic refreshing beverages by deaerating a sugar solution in accordance with step A whose concentration is at least as high as the maximum of the specified concentrations required in the different refreshing beverages in the amounts of additional deaerated water and/or carbon dioxide and beverage flavorings and/or additives controlled by a program to given amounts of the sugar solution.

It is to be understood that the process of the invention can be carried out using in step C beverage specific flavorings and/or raw materials, the latter as additives.

This invention also contemplates an apparatus for preparing a carbonated beverage comprising a first degasser for degassing a water therein which degasser is in fluid communication with a first mixing apparatus which just mixing apparatus is in fluid communication with means for adding powdered or liquid sugar thereto, a second degassing apparatus in fluid communication with said first mixing apparatus said second degassing apparatus in fluid communication with a second mixing apparatus for the addition of beverage flavorings and/or additives.

The second degassing apparatus can be in fluid communication with a third mixing apparatus disposed between said second degassing apparatus and said second mixing apparatus whereby the third mixing apparatus is in fluid communication downstream with the second mixing apparatus. Such third mixing apparatus permits addition of deaerated coater and/or carbon dioxide.

The apparatus can also have disposed between the second degassing apparatus and the third mixing apparatus and/or between the third mixing apparatus and the second mixing apparatus supply in containers. Additionally a third supply container can be connected to the output of the second mixing apparatus.

The apparatus is preferably one in which the respected mixing apparatuses comprise injectors provided with drive nozzles and vacuum chambers. Such injectors are useful in mixing deaerated water and/or deaerated sugar solutions with components to be mixed therewith. For instance, to the drive nozzles deaerated water or deaerated sugar solution can be fed and to whose vacuum chambers the substances which are to be added can be fed whereby intimate ad-mixture of the added substances and the deaerated water or deaerated sugar solution, as the case may be, is achieved.

In a particularly preferred embodiment the apparatus comprises means for determining the density and/or carbon dioxide of effluent from the second mixing apparatus and/or the third mixing apparatus and means in response thereto to regulate the control of feed of deaerated sugar solution and/or deaerated water and/or carbon dioxide through the respective mixing apparatuses. Such is particularly useful when in addition to the mixing apparatus provided for mixing the flavoring and/or additive to the deaerated sugar solution there is provided means for adding water and/or carbon dioxide to the deaerated product resulting from the second degassing apparatus. Thus, preferably a regulating circuit is connected to a feedback servo-control circuit for comparison of the carbon dioxide actual and required values. In such a system the carbon dioxide content of the final product is determined and that value used to adjust the quantity of carbon dioxide fed to the sugar solution at a point upstream thereof.

The apparatus preferably contains several reservoirs for beverage specific flavorings and/or additives (raw materials) which are connected to the second mixing apparatus through controllable feed devices. The feed devices can be controlled by a central process computer to meter the required amounts of flavorings and/or additives in response to various factors which are measured.

The apparatus is preferably one in which filters are disposed between the first mixing apparatus and the second degassing apparatus whereby to insure that the components in the second degassing apparatus are free from measurable amounts of undissolved solids etc.

The first degassing apparatus for degassing water can comprise a degassing tank into which a vacuum line connected to a vacuum pump enters at the top which tank is provided with an inlet and an outlet for the liquid to be degassed. Upstream of the inlet there can be disposed an injector whose drive nozzle is connected to the liquid feed line and whose vacuum chamber is connected to a gas source. The degassing tank can be so contoured, configured and arranged so that its expanse is greater in width than its height whereby to insure maximum reduction of the oxygen content in the water.

The secondary mixing apparatus can be connected directly to the outlet of the first apparatus for the degassing of water. The first mixing apparatus and the second degassing apparatus can be inter-connected by a plurality of bends in a section of pipe or tubing so that there is a slope at all points whereby to insure maximum intermixing of any powdered or liquid sugar added to the degassed water.

The apparatus can have reservoirs disposed at various points to contain beverage flavorings and/or additives. These reservoirs can be connected through controllable feed devices to pre-mixers in turn in fluid communication with the second mixing apparatus.

The basic concept of the invention is, in contrast to the known procedure, to produce not syrup but a sugar solution which serves as the basis for all of the different kinds of refreshing beverages which are to be made. This sugar solution, with a sugar concentration ranging from 7° to 20° Brix, is then subjected to an additional deaeration process whereby an extraordinarily low residual oxygen content of less than 0.1 mg/l is achieved.

The sugar solution thus deaerated serves as starting product for the preparation of all of the beverages on the basis of a given program. First the deaerated sugar solution can be adjusted with deaerated water to a concentration adapted to the manufacturer's entire line of beverages or to specific beverages. The deaerated sugar solution can be prepared continuously and then adjusted in several steps to specific sugar concentrations. Then it can be carbonated if desired, and finally, in a last step, shortly before delivery to the bottling apparatus, it can be provided with the flavoring substances specific to the beverage, such as for example raw materials fruit acids, citric acids, essences, and the like.

The deaeration of the water and of the sugar solution can be accomplished by a variety of known or older methods. It can be performed, for example, by vacuum degassing in which the liquid is introduced into a sealed chamber in which a given gas pressure below the atmospheric pressure is maintained and the gas emerging from the liquid is continuously pumped away. The deaeration can also be performed by a method that is generally referred to as "gas washing". In this process a different gas, such as nitrogen or carbon dioxide, is delivered in relatively large amounts to the liquid, and the liquid thus impregnated is fed to a gas washing column in what a part of the dissolved oxygen is washed out together with the washing gas at atmospheric pressure or a higher pressure.

Lastly, the deaeration of the water and/or sugar solution can be performed by an older method which is described in German Offenlegenschift No. 31 43 459. This is a method for driving out dissolved gases, especially for driving oxygen from liquids by vacuum degassing, in which a given amount of different gas which is soluble in the liquid, such as carbon dioxide or nitrogen gas, is dissolved in the liquid before it is introduced into the sealed chamber for the performance of the vacuum degassing, and the liquid thus impregnated is then subjected to vacuum degassing.

Especially by applying the last of the methods described above, extraordinarily low residual contents of the gas dissolved in the liquid can be achieved.

The method of the invention can be controlled very easily, and, depending on the parameters, an amount of degassed sugar solution can be prepared which corresponds to the amount of the end product which is taken by the bottling apparatus.

The apparatus of the invention is so constructed that all of the mixing and diluting processes can be performed under the control of regulators, and the overall control can be performed from a central computer.

In the apparatus of the invention it can be advantageous to connect to the first part of the apparatus, i.e., the one producing the sugar solution, several units connected in parallel which perform the subsequent steps of the process for the simultaneous production of different types of beverages.

The apparatus, however, can also be constructed such that all of the units performing the individual process steps are connected in series, and different types of beverage can be produced successively, under the control of a central processing computer.

The advantages which can be achieved with the method of the invention and the apparatus of the invention are summarized briefly hereinafter.

By the use of a starting product of extremely low oxygen content, it is possible, with the exclusion of contact with air in the individual process steps, to obtain an end product of very low oxygen content, so that no off-flavors or losses of flavor due to oxidation will take place and the end product will have excellent keeping properties.

Stocking of syrup is not necessary, and this has the advantage, among others, that no inversion of the sugar in the syrup can occur, which in known methods results in difficulties in the determination of the final sugar concentration.

No syrup losses occur in starting up beverage production, in changing beverages or in cleaning, because in the apparatus of the invention no syrup piping needs to be present.

When the beverage is changed, essentially only those parts of those parts of the apparatus have to be flushed out in which the flavoring substances specific to the beverage are present. This is only a small portion of the apparatus, and the flushing can be performed with deaerated water, so that the entire apparatus is kept air-free for the next beverage that is to follow, and it is possible to start up the next type of beverage without losses.

The mixers of conventional type set up for the processing of syrup do not need to be used in the process of the invention. Also, the responsibility for the product on the part of the person operating the bottling machine, in accordance with frequent practice, even though such a person additionally had to serve the mixer as well, is eliminated. Instead, it is possible to separate entirely the production operations of "beverage preparation" and "beverage bottling" in the manner practiced in breweries.

Production can be changed over within minutes from one kind of beverage to the other. Additional carbon dioxide washing of the finished product, which is often necessary in known processes, is unnecessary, with the result that losses of carbon dioxide and flavoring substances can be kept low.

The cleaning, disinfection and sterilization of the entire apparatus can take the same route as the components take in the production of the product.

An example of the embodiment of an apparatus for the practice of the method of the invention will be given below with the aid of the appended drawing.

BRIEF DESCRIPTION OF THE DRAWING

The drawing shows diagrammatically the construction of an apparatus with which different kinds of refreshing beverages can be manufactured successively. A first part of the apparatus is shown in FIG. 1, and this part is directly connected to a second part represented in FIG. 2.

DETAILED DESCRIPTION OF A PREFERRED EMBODIMENT

Figure 1:
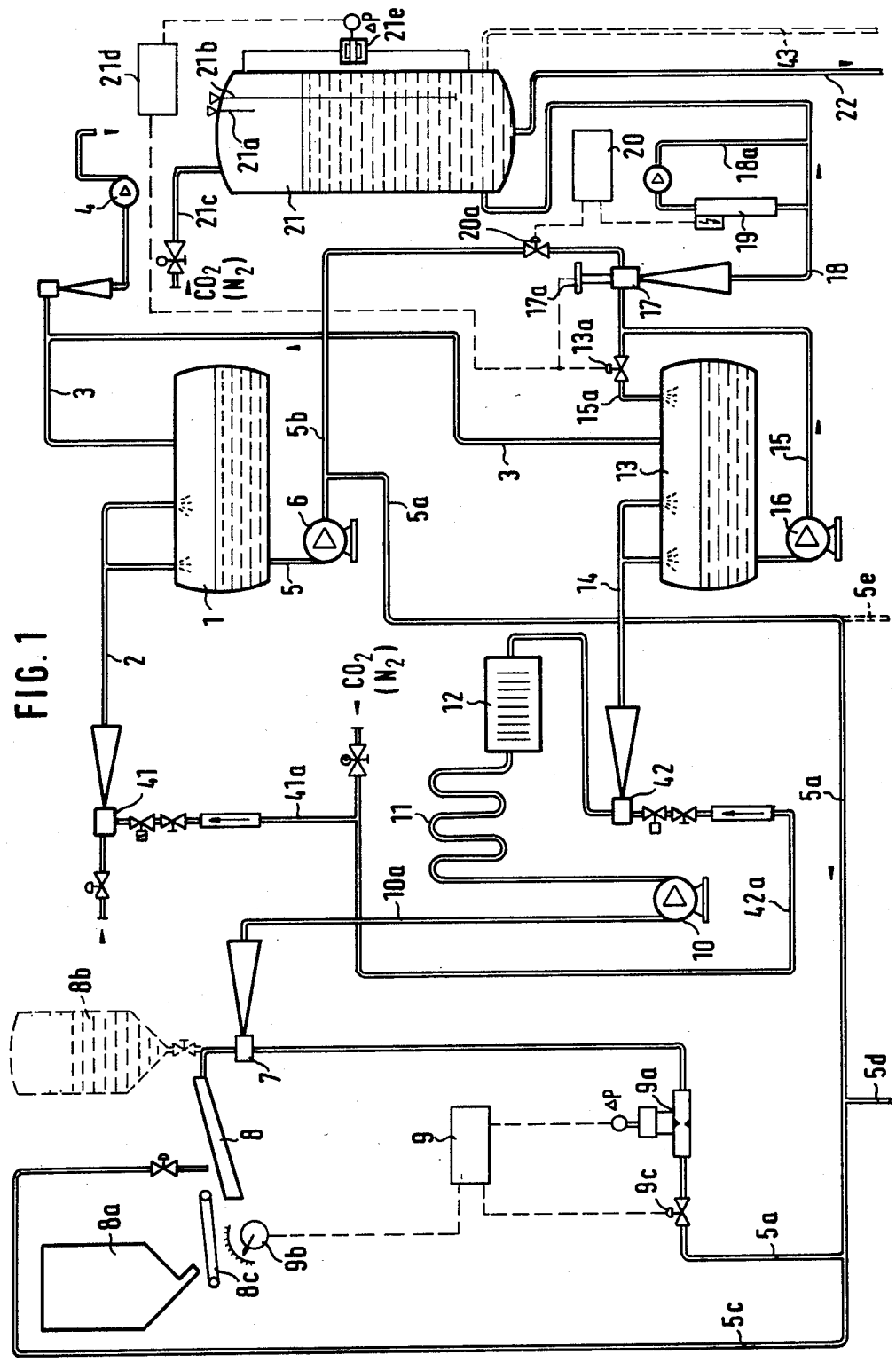

The apparatus has a first system for the vacuum degassing of water. This system contains a degassing tank 1 which can be so designed and arranged that it is wider than it is deep, and therefore a large liquid surface is achieved therein. The upper part of the degassing tank 1 is connected to a vacuum line 3 which is connected to a vacuum pump 4. A water line 2 delivers water into the upper part of the degassing tank 1 through spray nozzles. The bottom part of the degassing tank 1 is connected by a line 5 and a liquid pump 6 to two lines 5a and 5b through which the deaerated water is delivered. An injector 41 is inserted into the wafer infeed line 2, and its vacuum chamber is connected to a line 41a through which carbon dioxide gas or other inert gas such as nitrogen, is delivered in a given amount depending on the water feed. By this preimpregnation of the feed water an extraordinarily good deaeration of the water is achieved in the vacuum degassing that follows.

Line 5a leads to a first mixer 7 which is in the form of an injector. The deaerated water is delivered to the driving nozzle of the injector. Furthermore, either liquid sugar can be fed to the injector from a storage tank 8b, or powdered sugar can be fed to it from a storage hopper 8a. The powdered sugar first comes onto a conveyor 8c where it is moistened in a feeder 8 by a line 5c connected to the line 5a.

The feed of the deaerated water through the line 5a to the injector 7 is controlled by a regulator 9. For this purpose, the flow through the line 5a is measured by means of a flow meter 9a and the amount of powdered sugar is determined by a weight apparatus 9b. The controlling is performed by a control valve 9c in line 5a by means of a regulator 9 which in turn is controlled by the flow meter 9a and by the weigh apparatus 9b.

The sugar solution produced in the injector 7 is delivered by a liquid pump 10 through a line 10a and a serpentine coil 11 of considerable length which promotes dissolution, and through a filter 12 to a delivery line 14 which leads into the upper part of the degassing tank 13 of a second apparatus for the vacuum degassing of water.

The serpentine coil 11 in which the complete dissolution of the sugar is to take place is so arranged that at all points it has a downward slope so as to prevent the accumulation of sugar residues, at the bends, for example. Such an arrangement can be achieved, for example, by situating the serpentine coil in a plane sloping steeply downward. Other arrangements are, of course, also possible, such as for example causing the line to follow a helical course. Likewise, the sugar solution can be fed at this location through an upright cylinder having baffles in its interior to reverse the stream of liquid, these baffles being also arranged such that no sugar residues can be desposited on them.

An injector 42 is inserted into the line 14 feeding water to the degassing tank 13, in a manner similar to the one inserted into the supply line 2 to the degassing tank 1. The vacuum chamber of the injector 42 is connected to a feed line 42a through which carbon dioxide gas or nitrogen gas can be delivered. In this manner, the sugar solution that is to be degassed is also subjected to a preliminary impregnation and extremely good deaeration values are obtained in the subsequent vacuum degassing.

The upper part of the degassing tank 13 is furthermore connected to the vacuum line 3. The degassed sugar solution leaving the degassing tank 13 is driven by a pump 16 through a line 15 which leads to the nozzle of another injector 17 whose vacuum chamber can be fed with deaerated water through the line 5b and a control valve 20a. In the injector 17 a first adjustment of the deaerated sugar solution to a desired degree of concentration takes place. For this purpose the specific gravity of the sugar solution coming from the injector 17 is measured by means of a measuring device 19 in a bypass 18a in the discharge line 18 from the injector 17, and the valve 20a controlling the feed of deaerated water to the injector 17 is operated by a regulator 20. The line 18 from the injector 17 runs to a supply tank 21. The level of liquid in the supply tank 21 is continuously monitored by a differential pressure measuring device 21e, delivery being controllable through a regulator 21d connected to the measuring device 21e, on the basis of a preset value. This is accomplished in the following manner: the regulator 21d operates a feeding device 17a on the driving nozzle of the injector 17 and simultaneously operates in the opposite sense a control valve 13a which is disposed in a return line 15a from line 15 into the upper part of the degassing tank 13. Especially when the feed to the degassing tanks 1 and 13 is controlled, in a manner which is not shown, it is thus possible to have a good control of the feed of deaerated sugar solution to the supply tank 21. Furthermore, measuring instruments 21a for the maximum and 21b for the minimum liquid level are disposed in the supply tank 21. These meters are necessary for the purpose of turning pump 16 on or off, since the control valves operate only within the delivery range from 10 to 100%. The apparatus is also controllable manually.

The deaerated sugar solution can be kept in the supply tank 21 under an inert gas atmosphere of carbon dioxide, nitrogen or other inert gas delivered through line 21c.

Figure 2:
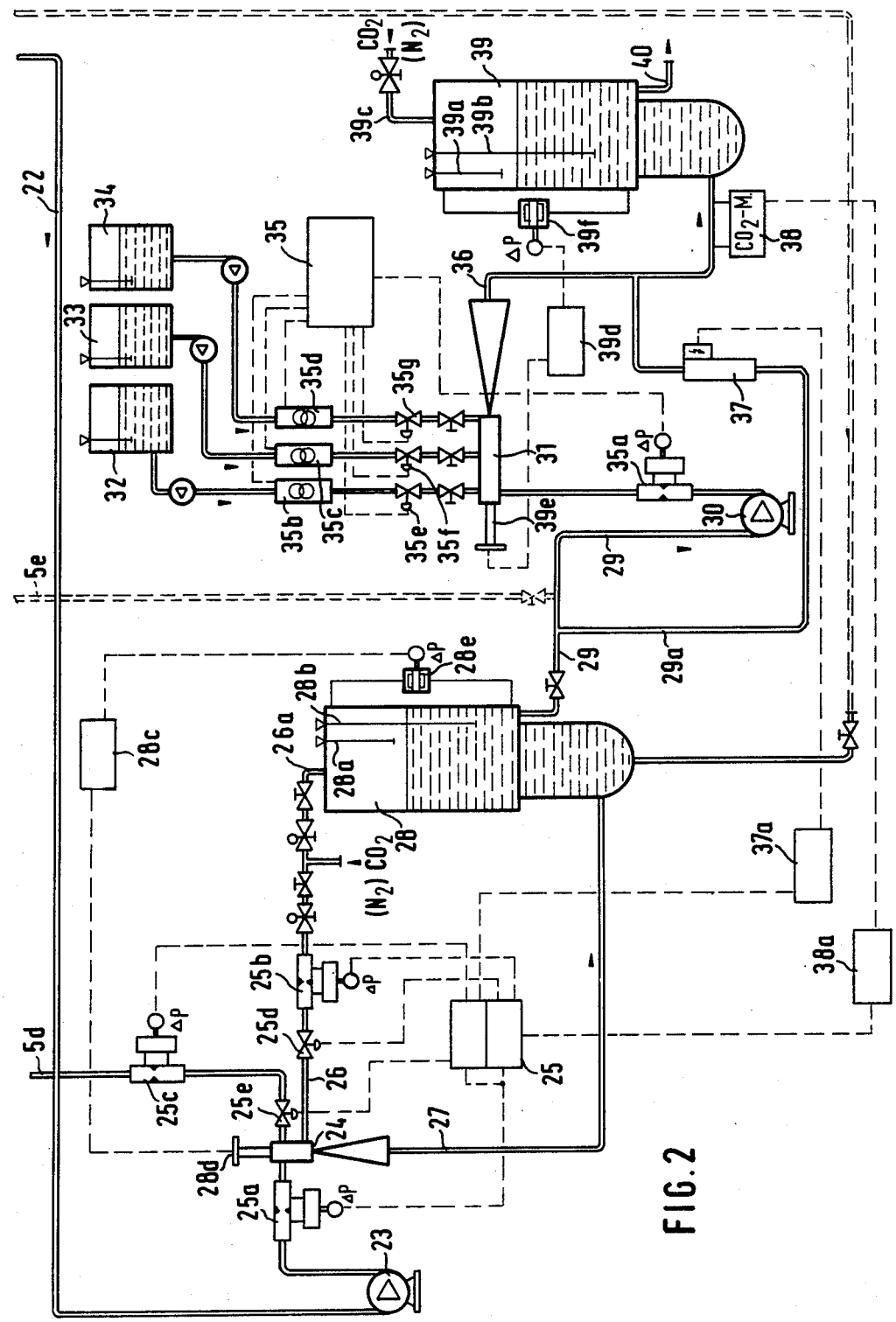

The advancement of the deaerated sugar solution from the supply tank 21 is performed through a line 22 to the parts of the apparatus represented in FIG. 2.

The parts of the apparatus that will be desribed below can be present in more than one set and can be connected in parallel in individual branches.

The line 22 leads through a pump 23 and a flow meter 25a into the nozzle of another injector 24, which serves as an additional mixer, for the purpose of the further adjustment of the concentration of the deaerated sugar solution as well as for any desired carbonation of the sugar solution in the preparation of beverages containing carbon dioxide.

For this purpose deaerated water is fed to the injector 24 through a line 5d which is connected to the line 5a, and through a flow meter 25c and a control valve 25e. Furthermore, carbon dioxide gas can be fed through a line 26 from a carbon dioxide gas source through a flow meter 25b and a control valve 25d. The operation of the control valves 25d and 25e is performed by a regulator 25 in the manner described further below.

The line 27 from the injector 24 leads into another supply tank 28. The level of liquid in this supply tank 28 is continuously monitored by a pressure-type device 28e which is connected to a regulator 28c which controls a feed device 28d on the injector 24. The upper part of the supply tank 28 is connected to the line 26a delivering carbon dioxide gas. In the preparation of noncarbonated beverages, the supply tank 28 can also be connected to a line for the feeding of another inert gas such as nitrogen.

Also provided in the supply tank 28 are meters 28a and 28b for the maximum and minimum liquid levels, respectively, and these meters turn pump 23 on and off. Here, again, manual control is possible.

The line 29 from the supply tank 28 is connected through an additional pump 30 and a flow meter 35a to the drive nozzle of another injector 31 which constitutes the mixing apparatus whereby the particular flavoring agents and/or raw materials of the deaerated sugar solution are fed.

The flavoring agents and/or raw materials are contained in reservoirs 32, 33 and 34. A larger number of such supply tanks can also be connected to the injector 31. The reservoirs 32, 33 and 34 are connected to the vacuum chamber of the injector 31 through flow meters 35b, 35c and 35d and control valves 35e, 35f and 35d. The operation of the valves 35e, 35f and 35g is controlled by a processing computer 35 which operates on the basis of a pre-established program. An additional control signal is delivered to the processing computer 35 by the flow meter 35a. A bypass line 29a leading from line 29 from the supply tank 28 and containing a device 37 for measuring specific gravity is connected to the line 36 from the injector 31. A device on the line 36 serves for the measurement of the carbon dioxide content in the end product. The signals delivered by the apparatus 37 and 38 are fed through servo circuits 37a and 38a, respectively, to the regulator 25, which accordingly controls the deaerated water and the carbon dioxide gas through the valves 25e and 25d.

The end product is fed through the line 36 to a final supply tank 39 whose level is monitored by a differential pressure device 39f and regulated by means of a control device which operates a servo feeder 39e on the drive nozzle of the injector 31. In this supply tank again, the maximum and minimum level is monitored by the meters 39a and 39b.

The end product is delivered to the bottling machine through a line 40.

A line 5e serves for cleaning the parts of the apparatus contaning the beverage-specific flavoring agents and/or raw materials in the case of a product changeover. Line 5e is connected to line 5a and can carry the deaerated water from line 29 from the supply tank 28.

The bottom of the supply tank 28 is connected by a line 43 and a valve 43a to the supply tank 21. In the event of a beverage changeover, when the sugar solution contained in the tank 28 cannot be used for the preparation of the new beverage, first the sugar solution contained in line 27 is forced by the pressure of the gas fed in through line 26 into the supply tank 28. Then the content of the supply tank 28 is forced, again by gas pressure through the line 26a and by opening the valve 43a, into the supply tank 21. The supply tank 28 can then be filled with a new sugar solution adjusted to a prescribed concentration.

The operation of the described apparatus is as follows:

In the first mixer, i.e., the injector 7, a sugar solution of predetermined concentration is produced from powdered sugar or liquid sugar coming from the storage containers 8a and 8b and water from the first apparatus for the vacuum degassing of water, namely the degassing tank 1, the concentration being adjustable through the regulating device 9, and this solution is fed to the second apparatus for the vacuum degassing of water, namely the degassing tank 13 in which the deaeration of the sugar solution takes place.

Then, while deaerated water is fed from the degassing tank 1, a first adjustment of the sugar content of the solution is performed in the injector 17 by dilution, and it can be preset at the regulator 20.

The deaerated sugar solution collected in the supply tank 21, whose concentration has been given a preliminary adjustment, is subjected in the injector 24 to a final adjustment corresponding to the specific type of beverage, the control being performed by the regulator 25 in accordance with the data (specific gravity, carbon dioxide content) measured in the end product by the devices 37 and 38.

The deaerated sugar solution whose concentration has been finally adjusted in the supply tank 28, and which has been carbonated if desired, is mixed in the injector 31 with the flavoring substances and/or raw materials specific for the beverage from the reservoirs 32, 33 and 34 and then fed through the supply tank 39 and line 40 to the bottling apparatus.

As it can be seen directly from the drawing, it is possible by the use of the various supply tanks 21, 28 and 39, and the regulators 9, 20, 21d, 25, 28c and 39d, to achieve an extremely flexible adaptation of the amounts of intermediate products produced to the amount of the end product that is to be taken off. The step-wise adjustment of the concentrations of the sugar content of the deaerated sugar solution and the testing of the end product for sugar concentration and carbon dioxide content, and the "feedback" control which this involves, and the computer controlled feeding of the flavoring agents and/or raw materials specific for the beverage, make possible an extremely accurate adjustment of the end product to specific contents of the substances added, and a synchronization of the production of the sugar solution as well as the addition of the flavoring agents and/or raw materials in accordance with the amount taken by the bottling machine.

Also, by the system of the supply containers 21, 28 and 39 and the regulating circuits connected with these supply containers for control of the level of material therein, a good isolation of the individual parts of the apparatus is achieved, so that disturbances which occur in any part of the apparatus, for example at the beginning or at the end, do not need to have any effect on the other parts of the apparatus.

In accordance with a variant of the above-described embodiment of the apparatus of the invention which is not shown in the drawings, the supply containers 32 to 34 are not to be connected directly through the servo valves 35e to 35g to the vacuum chamber of the injector 31, but through a mixer. In this mixer, then, a specified mixture of the flavoring substances and/or raw materials specific for the beverage is produced and this mixture is fed to the injector 31. In this embodiment, a changeover to manual control of the apparatus can be made in an especially simple manner.

What is claimed is:

1. A process for preparing a nonalcoholic beverage comprising the steps of:
   A. preparing a sugar solution consisting essentially of powdered or liquid sugar dissolved in deaerated water wherein said solution has an oxygen content below 0.15 mg/l sugar and a sugar concentration of 7° to 20° Brix;
   B. adjusting the concentration of oxygen in the resultant sugar solution to less than 0.1 mg/l by deaerating the same; and
   C. adding flavoring material or additives to the deaerated sugar solution.

2. A process according to claim 1 wherein the deaeration of the water and/or sugar solution is performed by vacuum degassing.

3. A process according to claim 2 wherein a given amount of a different gas soluble in the liquid is dissolved in the water and/or sugar solution prior to the vacuum degassing and the liquid thus impregnated is subjected to vacuum degassing.

4. A process according to claim 1 wherein the water and/or sugar solution is deaerated by gas washing.

5. A process according to claim 1 wherein the deaerated sugar solution is adjusted by adding deaerated water thereto to a given concentration before adding the flavoring materials or additives.

6. A process according to claim 1 wherein the deaerated sugar solution is carbonated and adjusted to a carbon dioxide concentration before the addition of said flavoring materials or additives.

7. A process according to claim 6 wherein after the addition of the flavoring materials or additives, the density and/or the carbon dioxide content of the end product is measured and the feed of deaerated water and/or carbon dioxide to the deaerated sugar solution is regulated to obtain a desired density.

8. A process, for the simultaneous or alternating production of different non-alcoholic beverages, according to claim 1 wherein said sugar concentration is at least as high as the maximum concentration needed in said different beverages and further comprising the addition of deaerated water and/or carbon dioxide prior to said addition of flavoring material or additives.

* * * * *

UNITED STATES PATENT AND TRADEMARK OFFICE
CERTIFICATE OF CORRECTION

PATENT NO. : 4,599,239

DATED : July 8, 1986

INVENTOR(S) : Dieter Wieland et al.

It is certified that error appears in the above-identified patent and that said Letters Patent is hereby corrected as shown below:

On the title page after (73) Assignee, "Follpack" should read -- Füllpack --.

After (75) Inventors:, and after (73) Assignee, line 2 (in each), "Dusseldorf" should read -- Düsseldorf --.

Col. 2, lines 49 and 55, "Similarily" should read -- Similarly --.

Col. 6, line 38, "wafer" should read -- water --.

Col. 6, line 59, "weigh" should read -- weight --.

Col. 7, line 64 "desribed" should read -- described --.

Signed and Sealed this

Ninth Day of December, 1986

*Attest:*

DONALD J. QUIGG

*Attesting Officer*   *Commissioner of Patents and Trademarks*